(12) United States Patent
Okutani

(10) Patent No.: US 7,639,942 B2
(45) Date of Patent: Dec. 29, 2009

(54) OBSERVATION DEVICE AND CAMERA

(75) Inventor: Tsuyoshi Okutani, Machida (JP)

(73) Assignee: Nikon Corporation, Tokyo (JP)

( * ) Notice: Subject to any disclaimer, the term of this patent is extended or adjusted under 35 U.S.C. 154(b) by 186 days.

(21) Appl. No.: 12/003,494

(22) Filed: Dec. 26, 2007

(65) Prior Publication Data

US 2008/0187307 A1 Aug. 7, 2008

(30) Foreign Application Priority Data

Dec. 26, 2006 (JP) .............................. 2006-350021

(51) Int. Cl.
*G09B 13/02* (2006.01)

(52) U.S. Cl. ........................ 396/383; 396/354; 396/358; 396/373

(58) Field of Classification Search ................. 396/373, 396/427, 354, 358, 378–381
See application file for complete search history.

(56) References Cited

U.S. PATENT DOCUMENTS

| | | | | |
|---|---|---|---|---|
| 4,431,285 A | * | 2/1984 | Kajita et al. ................. | 396/272 |
| 5,627,618 A | * | 5/1997 | Kasai et al. .................. | 396/379 |
| 6,311,022 B2 | * | 10/2001 | Hori ............................ | 396/266 |
| 6,700,617 B1 | * | 3/2004 | Hamamura et al. ......... | 348/351 |
| 2007/0009255 A1 | * | 1/2007 | Iwane ......................... | 396/296 |

FOREIGN PATENT DOCUMENTS

| | | |
|---|---|---|
| JP | 58-106530 | 6/1983 |
| JP | 2000-013662 | 1/2000 |
| JP | 2000-292831 | 10/2000 |
| JP | 2002-300435 | 10/2002 |
| JP | 2005-311764 | 11/2005 |

* cited by examiner

*Primary Examiner*—W B Perkey
*Assistant Examiner*—Warren K Fenwick

(57) ABSTRACT

The observation device includes: an optical unit on which an intermediate image of an object to be observed is formed; a display unit that displays an image of a subject to be photographed; and a display unit moving unit that causes the display unit to be inserted in and removed from an optical light path for observing the object without moving the optical unit. Also, the camera includes: a finder optical system and an image-capturing unit that captures an image of a subject. The finder optical system includes an eyepiece unit; a focal plane plate on which an intermediate image of an image of a photographic subject is formed; a display unit that emits light; and a display unit moving unit that causes the display unit to be inserted in and removed from a light path in a position closer to the eyepiece unit than the focal plane plate.

20 Claims, 11 Drawing Sheets

OBSERVATION DEVICE AND CAMERA

INCORPORATION BY REFERENCE

The disclosure of the following priority applications are herein incorporated by reference:

Japanese Patent Application No. 2006-350021 (filed Dec. 26, 2006).

BACKGROUND OF THE INVENTION

1. Field of the Invention

The present invention relates to an observation device for observing an object and a camera in which such an observation device is provided.

2. Description of Related Art

There has been known a technology of fitting a display device in a single-lens reflex camera equipped with an optical finder as disclosed in Japanese Laid-open Patent Application No. Sho-58-106530.

SUMMARY OF THE INVENTION

In a conventional camera that includes a focal plane plate and a display device, an image formation plane of the focal plane plate has to be approximately identical with a display plane of the display device. However, it is undesirable that the focal plane plate is moved since the focal plane plate is required to be arranged in a high precision.

According to a first aspect, the present invention provides an observation device, including: an optical unit on which an intermediate image of an object to be observed is formed; a display unit that displays an image of a subject to be photographed; and a display unit moving unit that causes the display unit to be inserted in and removed from an optical light path for observing the object without moving the optical unit.

According to a second aspect, in the observation device according to the first aspect, the display unit is inserted in the optical light path for observing the object in a position that is different from a position of the optical unit and from a position in which the intermediate image is formed.

According to a third aspect, the present invention provides a camera, including: a finder optical system; and an image-capturing unit that captures an image of a subject, wherein the finder optical system includes an eyepiece unit; a focal plane plate on which an intermediate image of an image of a photographic subject is formed; a display unit that displays an image of a subject to be photographed; and a display unit moving unit that causes the display unit to be inserted in and removed from a light path in a position closer to the eyepiece unit than the focal plane plate.

According to a fourth aspect, the camera according to the third aspect further includes: a mirror capable of being switched between a first position in which upon observation of the image of the subject by the finder optical system, light flux from the photographic subject is reflected by the mirror to be guided to the finder optical system and a second position in which upon photographing, light flux from the photographic subject is directed to the image capturing unit; and a switching unit that switches the position of the mirror. The display unit is inserted in and removed from the light path interlocked with switching of the position of the mirror by the switching unit.

According to a fifth aspect, in the camera according to the third aspect, the display unit is inserted in and removed from the light path of the finder optical system perpendicular to an axis of the light path.

According to a sixth aspect, in the camera according to the third aspect, the display unit displays the image of the subject captured by the image-capturing unit.

According to a seventh aspect, in the camera according to the sixth aspect, the display unit displays a photographic condition upon capturing the image of the subject.

According to an eighth aspect, the camera according to the third aspect, further includes: a pentaprism located in the optical light path between the focal plane plate and the eyepiece unit, wherein the display unit is inserted in and removed from the light path of the finder optical system in a position closer to the eyepiece unit than the pentaprism.

According to a ninth aspect, in the camera according to the eighth aspect, the eyepiece unit includes a plurality of lenses; and the display unit is inserted in and removed from the optical path in a position between the lenses in the eyepiece unit.

According to a tenth aspect, the camera according to the eighth aspect, further includes: a lens for adjusting a focus state of a display output by the display unit.

According to an eleventh aspect, in the camera according to the ninth aspect, the lenses in the eyepiece unit are adjustable to vary a distance therebetween to adjust a focal length of the eyepiece unit.

According to a twelfth aspect, the camera according to the eighth aspect, further includes: a mirror capable of being switched between a first position in which upon observation of the image of the subject by the finder optical system, light flux from the photographic subject is reflected by the mirror to be guided to the finder optical system and a second position in which upon photographing, light flux from the photographic subject is directed to the image capturing unit; and a switching unit that switches the position of the mirror, wherein the display unit is inserted in and removed from the light path interlocked with switching of the position of the mirror by the switching unit.

According to a thirteenth aspect, in the camera according to the eighth aspect, the display unit is inserted in and removed from the light path of the finder optical system perpendicular to an axis of the light path.

According to a fourteenth aspect, in the camera according to the eighth aspect, the display unit displays the image of the subject captured by the image-capturing unit.

According to a fifteenth aspect, in the camera according to the fourteenth aspect, the display unit displays a photographic condition upon capturing the image of the subject.

According to a sixteenth aspect, in the camera according to the third aspect, the display unit is removed from the optical light path in a deformed state.

According to a seventeenth aspect, in the camera according to the first aspect, the display unit includes a self-luminescent element.

According to an eighteenth aspect, in the camera according to the first aspect, the display unit includes a light source.

According to a nineteenth aspect, the camera according to the sixth aspect further includes; a back monitor disposed on a rear surface of the camera to display the image of the subject captured by the image-capturing unit, a selection unit that select one of the display unit and the back monitor, and a display control unit to control a display of the captured image of the subject on the selected one of the display unit and the back monitor. The display control unit causes the display unit to be inserted in the optical light path, when the selection unit selects the display unit and to be removed from the optical light path, when the selection unit selects the back monitor.

According to a twentieth aspect, the camera according to the nineteenth aspect further includes: a mirror capable of being switched between a first position in which upon observation of the image of the subject by the finder optical system, light flux from the photographic subject is reflected by the mirror to be guided to the finder optical system and a second position in which upon photographing, light flux from the photographic subject is directed to the image capturing unit; and a switching unit that switches the position of the mirror. The display unit is inserted in and removed from the light path interlocked with switching of the position of the mirror by the switching unit.

According to the present invention, the focal plane plate does not have to be moved, so that the observation device and the camera of the present invention have excellent precision in arrangement of the focal plane plate.

DETAILED DESCRIPTION OF THE INVENTION

Figure 1A:
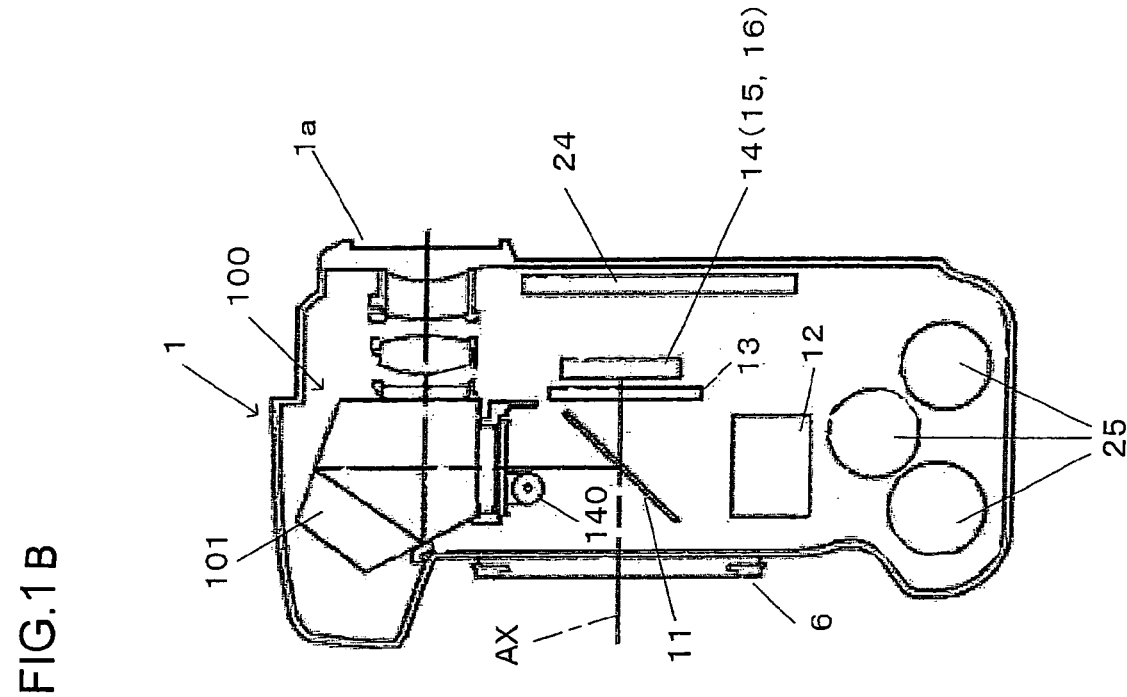
FIG. 1A is a cross-sectional front view showing a camera body of a single-lens reflex camera according to an embodiment of the present invention as seen from below.
Figure 1B:
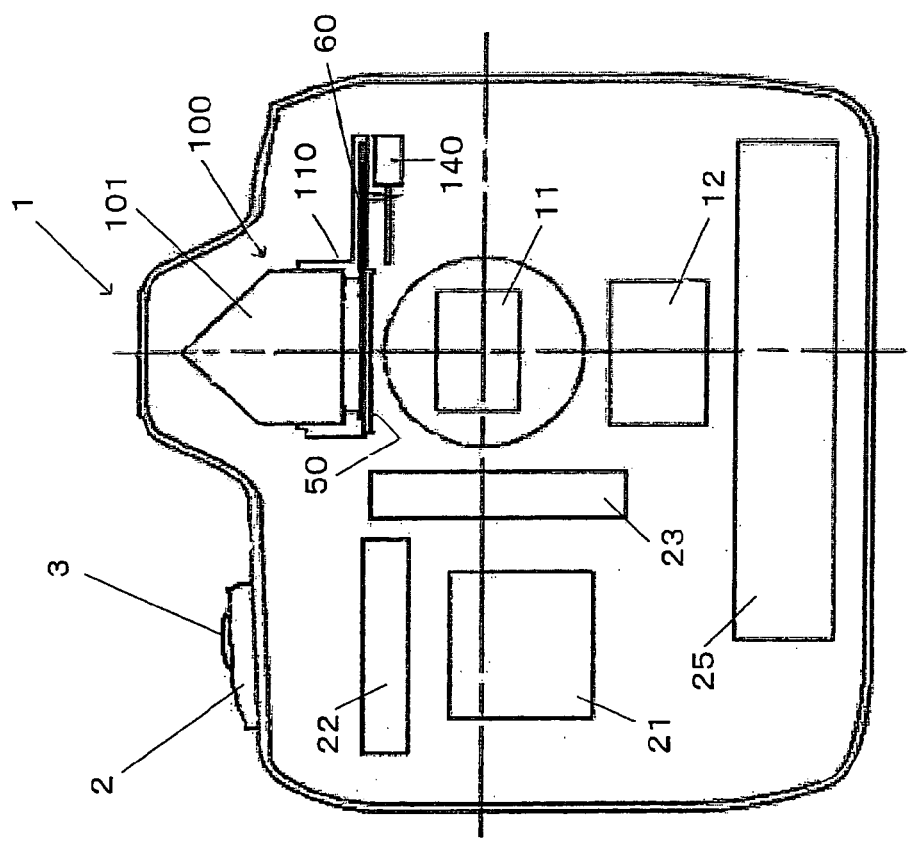
FIG. 1B is a cross-sectional side view showing a camera body of a single-lens reflex camera according to an embodiment of the present invention.

Referring to FIGS. 1A to 10, an observation device according to one embodiment of the present invention as applied to a camera is explained. FIG. 1A is a cross-sectional front view showing a camera body of a single-lens reflex camera body of a camera according to an embodiment of the present invention as seen from below and FIG. 1B is a cross-sectional side view of the camera body shown in FIG. 1. As shown in FIGS. 1A and 1B, a camera body 1 includes a main switch 2 and a release button 3. Also, the camera body 1 includes an eyepiece unit 1a of a finder through which an image of a photographic subject is observed.

The camera body 1 includes in the front part thereof a lens mount 6 to which an interchangeable lens (not shown) can be detachably attached. The camera body 1 also includes in the inside thereof a main mirror 11 that guides a light flux of a photographic subject to a finder unit 100 detailed below. The main mirror 11 is provided at the back (on the back side) thereof with a submirror (not shown) that guides the light flux of the photographic subject to an AF sensor 12 that performs detection of focus. The main mirror 11 and the submirror (not shown) are rotatably provided so that they can be retracted from a photographic light path upon release action or upon display of a "through image" as detailed below. The AF sensor 12 is arranged on the lower side of the main mirror 11.

On a rear side photographic light path of the main mirror 11, there are arranged a shutter 13 and an image-capturing unit 14 in sequence from front backward. The shutter 13 is a mechanism having a set of shielding blades that performs opening and closing movements between a closed state in which a photographic aperture (not shown) is shut to shield the image-capturing unit 14 and an open state in which the photographing aperture is opened to guide the light flux of the photographing subject to the image-capturing unit 14. The image-capturing unit 14 includes an image-capturing element 15 and an optical filter 16 arranged in front of the image-capturing element 15. The image-capturing element 15, such as a CCD, is an element that captures an image formed by the light flux of the photographic subject to output a captured-image signal. The optical filter 16 is a filter that has, in combination, a function of an infrared cut filter that cuts off infrared light and a function of a low pass filter that prevents a moiré phenomenon from occurring.

On the left hand side of the camera body 1 as seen from the anterior thereof, there are provided a control circuit 21 that controls each unit of the camera body 1, a sequence drive mechanism 22, and a mirror drive mechanism 23. On the rear side of the camera body 1, there is provided a rear side liquid crystal device 24. A battery 25 is arranged such that it extends in the direction from the left to right at the bottom of the camera body 1. The control circuit 21 includes a CPU and peripheral components and controls the camera in whole; for example, it performs control of drive of the image-capturing element 15, processing of a captured image, detection and adjustment of the focus of an interchangeable lens, control of aperture, control of the drive of a rear side liquid crystal device, and control of the sequence drive mechanism 22.

The sequence drive mechanism 22, which is a drive mechanism that includes a sequence motor (not shown), performs drive of the mirror drive mechanism 23 and shutter charging in response to an instruction from the control circuit 21. The mirror drive mechanism 23 is a drive mechanism that rotates the main mirror 11 and the submirror (not shown) with power transmitted from the sequence control mechanism 22. The rear liquid crystal device 24 is a display device provided on the rear side of the camera body 1 as described above and displays a through image (also referred to as a live view image or a live preview image) or various types of information. The through image is a preparatory photographing image that is repeatedly captured by the image-capturing element 15 as a preliminary step toward actual photographing.

Figure 2:
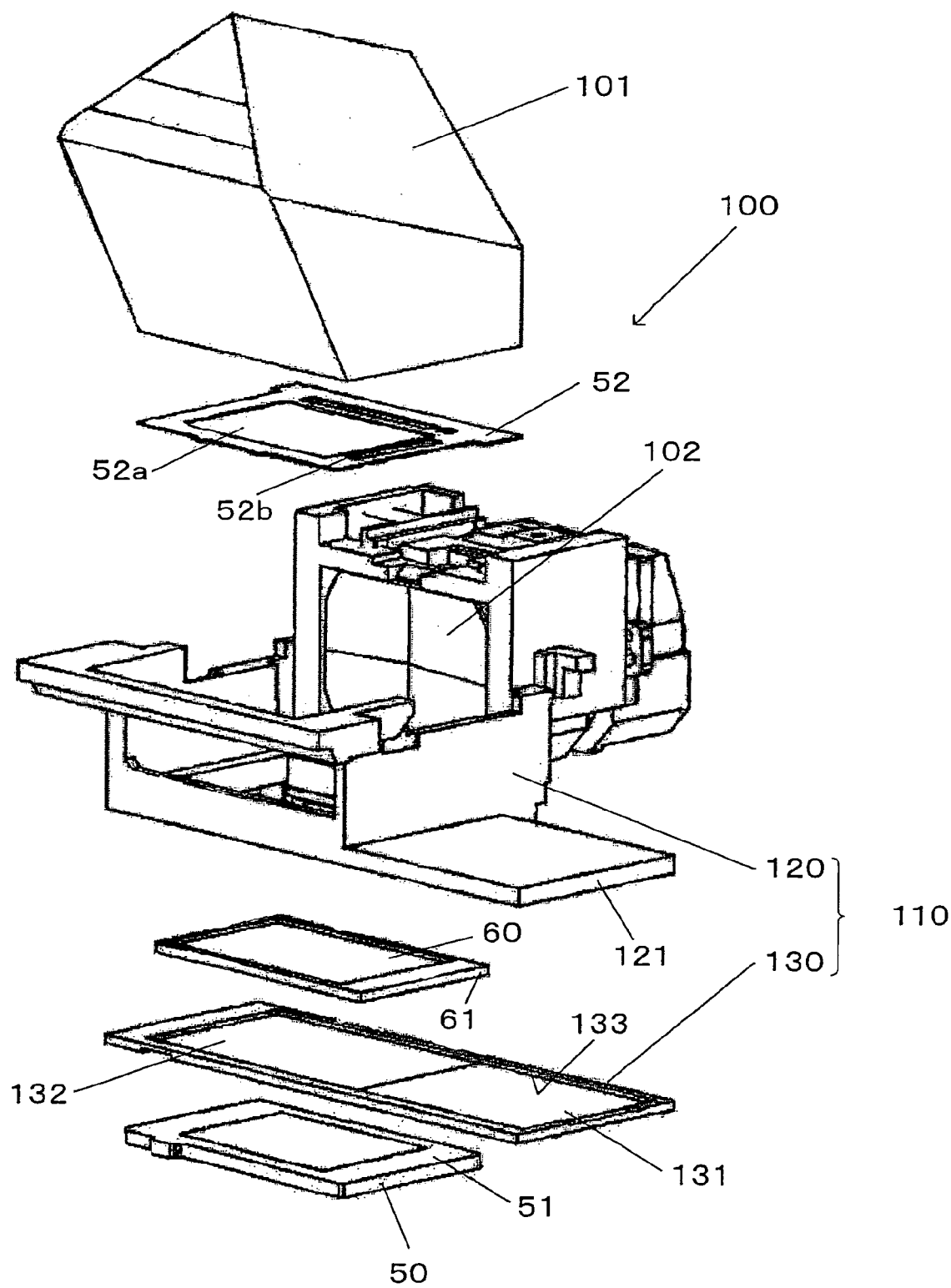
FIG. 2 is an exploded perspective view showing a finder unit of the camera shown in FIGS. 1A and 1B.
Figure 3:
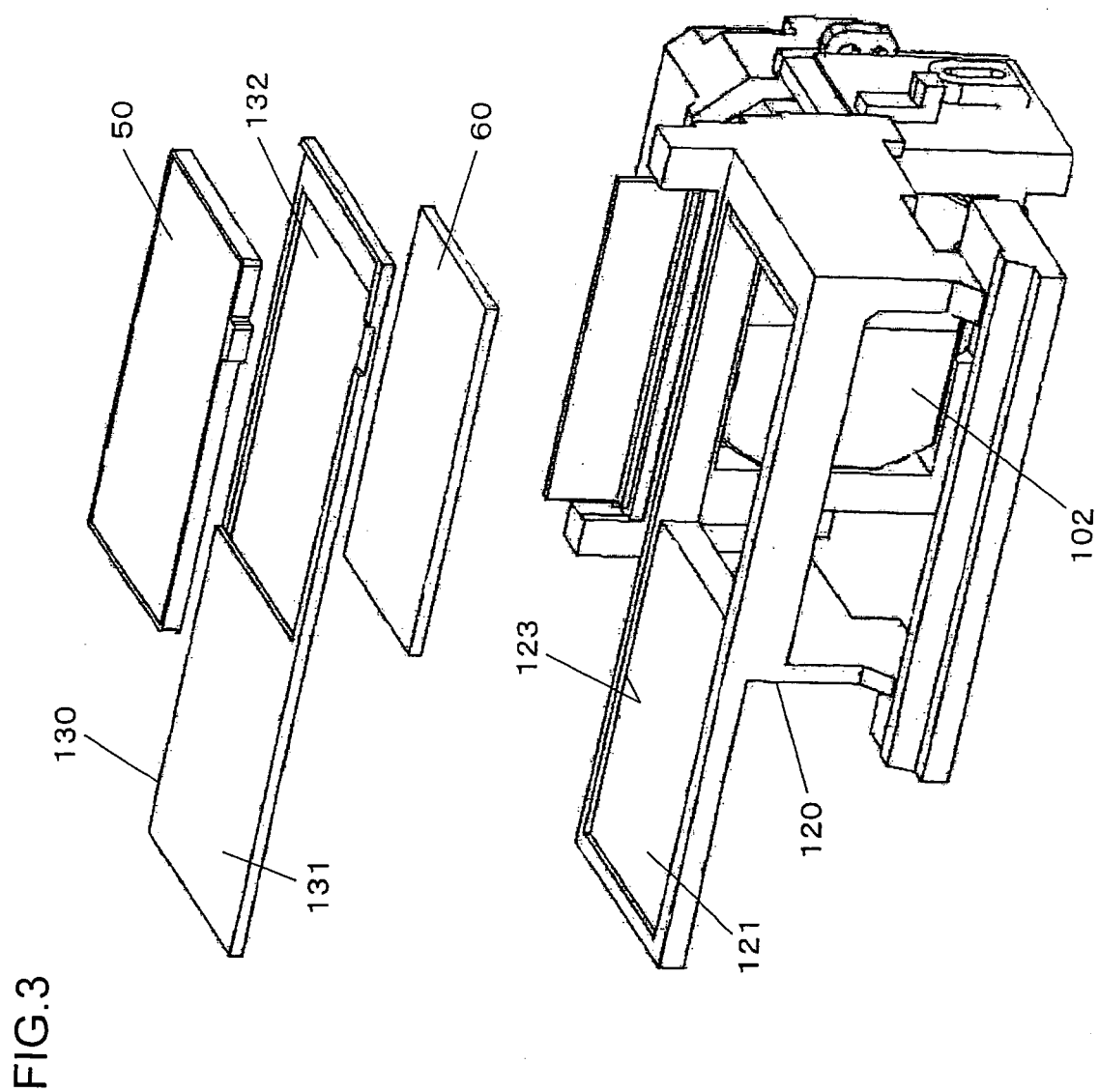
FIG. 3 is an exploded front perspective view of the finder unit of the camera shown in FIGS. 1A and 1B as seen diagonically forward from below.

The finder unit 100 is provided in the upper part of the camera body 1. FIG. 2 is an exploded perspective view of the finder unit 100 and FIG. 3 is an exploded front perspective view of the finder unit 100 as seen diagonically forward from below. The finder unit 100 includes, along an incident optical axis AX (FIG. 1) in order starting from the photographic subject as shown in FIG. 2, a focal plane plate 50, on which the light flux from the photographic subject forms an image, a first viewing field frame 51 that determines the size of the field of view of finder, a display device 60, a second viewing field frame 52, a pentaprism 101, and an eyepiece lens 102.

Each of the components 50, 51, 52, 60, 101, and 102 that constitute a finder optical system is attached to a finder case 110. Explanation on the finder case 110 will be made later on. The finer unit 100 is configured such that when the finder case 110 is attached to the upper part of the camera body 1, the focal plane plate 50 is arranged so as to be brought in a position conjugate to the image-capturing element 15.

The first viewing field frame 51 is the same as a viewing field frame used in the finder optical system of a conventional camera that determines the size of the viewing field of the finder. The second viewing field frame 52 is a viewing field frame for preventing stray light from the display device 60 detailed hereinbelow. The second viewing filed frame 52 includes a first aperture 52a that enables observation of an image of a subject formed on the focal plane plate 50 or observation of a through image displayed on the display device 60 as detailed hereinbelow. The second viewing filed frame 52 also includes a second aperture 52b that enables observation of the content of display, such as photographic conditions displayed on the display device 60 (FIG. 2).

The finder case 110 includes an upper case 120 and a lower case 130 (FIG. 2). To the upper case 120, which is an upper part of the finder case 110, there are attached the pentaprism 101, the eyepiece lens 102, and the second viewing field frame 52. On the right hand side of the upper case 120, there is provided an upper retraction section 121 arranged above the display 60. The upper retraction section 121 is configured to accommodate therein the display device 60 when the display device 60 is retracted from an optical light path that passes between the focal plane plate 50 and the pentaprism 101. The lower case 130 is a member that is provided so as to cover the bottom surface of the upper case 120. The lower case 130 includes a lower retraction section 131 arranged below the display device 60 facing the upper retraction section 121 above the display device and an aperture 132 through which the optical light path extends between the focal plane plate 50 and he pentaprism 101. To the lower case 130, there are attached the focal plane plate 50, the first viewing field frame 51 and a display device drive unit 140 (FIG. 1) detailed hereinbelow.

Figure 4:
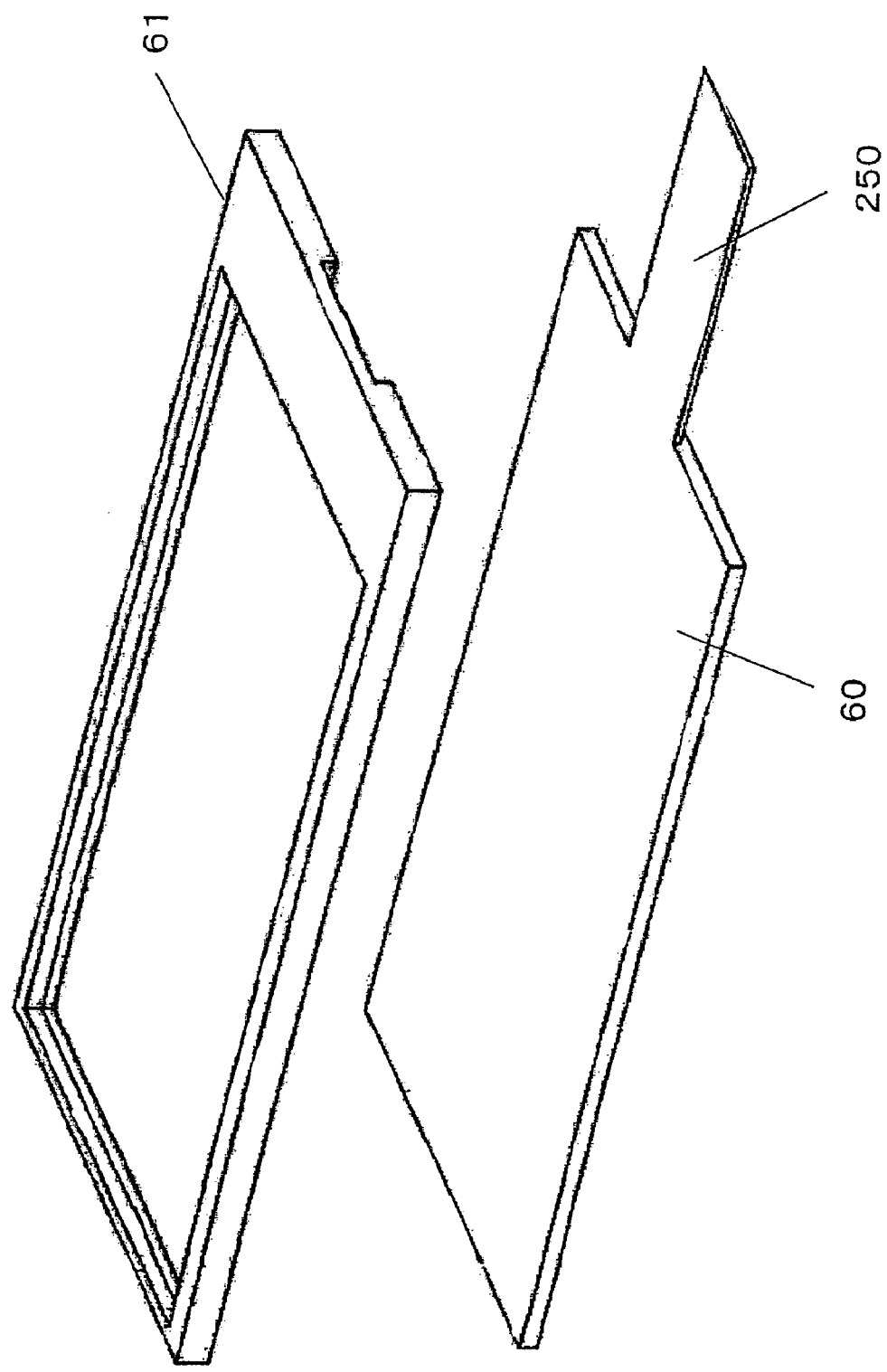
FIG. 4 shows in a perspective view a display device and a frame part according to an embodiment of the present invention.

As shown in FIG. 4, the display device 60 is a display device that includes a self-luminescent element such as a thin organic EL. (electroluminescent) element. As described hereinbelow, the display device 60 is movably arranged in the camera body 1 such that it can be inserted (loaded) in or removed (retracted) from the optical light path between the focal plane plate 50 and the pentaprism 101 perpendicularly to the optical axis of the optical light path and displays a through image and various types of information. When the display device 60 is inserted in the optical light path (hereinafter, also simply referred to as "light path") between the focal plane plate 50 and the pentaprism 101, the orientation of a display surface of the focal plane plate 50, that is, a direction perpendicular to the display surface coincides with the direction of the optical axis of the light path. The display device 60 is a display device that is electrically driven; it is connected to the control circuit 21 through a flexible printed circuit board (hereinafter, referred to as "FPC") 250. The display device 60 is attached to a frame part 61.

Figure 5A:
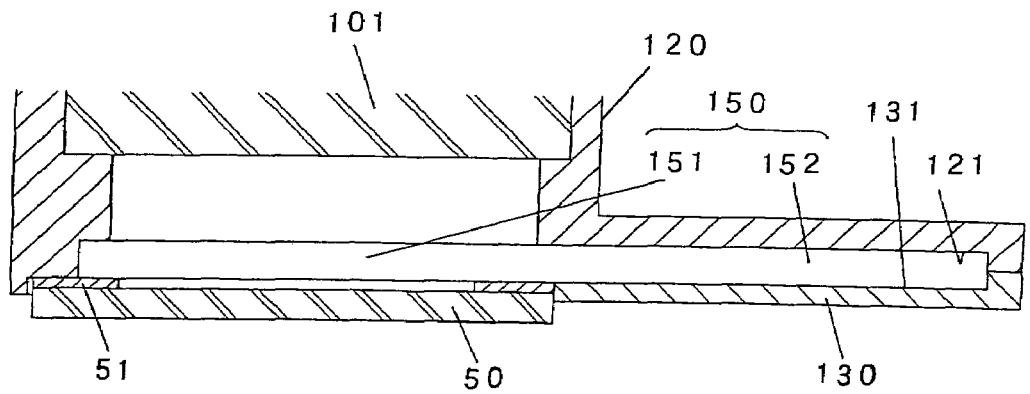
FIGS. 5A to 5C are each a schematic cross-sectional view showing a lower part of a finder case as seen from forward according to an embodiment of the present invention.
Figure 5B:
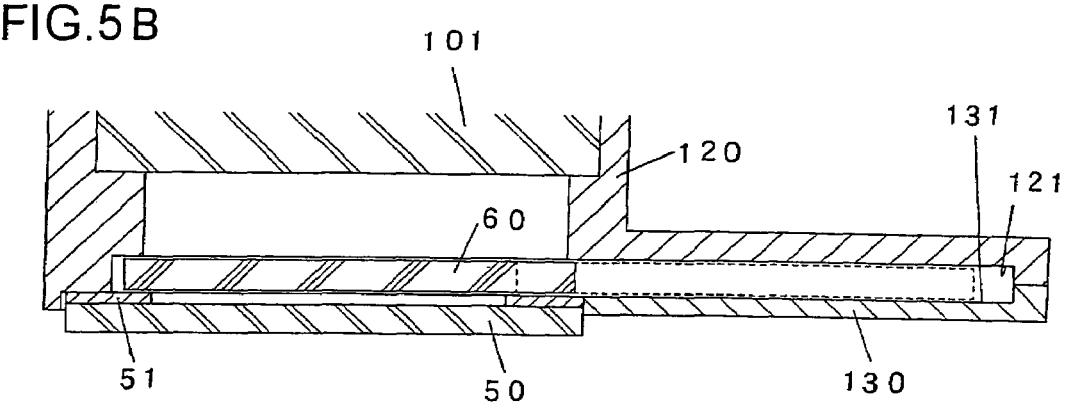
Figure 5C:
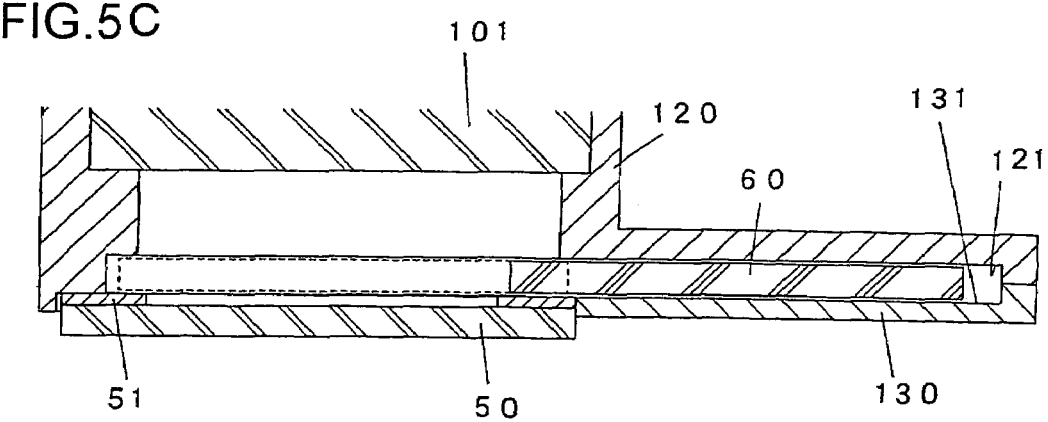

FIGS. 5A to 5C are each a schematic cross-sectional view showing a lower part of the finder case 110 as seen from forward. Note that for convenience' sake, in FIGS. 5A to 5C, the drawings are depicted such that the length in the vertical direction is greater than the length in the horizontal direction, so that depiction of, for example, the second viewing field frame 52, the slide rails 123 and 133 detailed below, and the frame part 61 is curtailed. Further, in FIG. 5A, depiction of the display device 60 is also curtailed. When the lower case 130 is attached to the bottom of the upper case 120, there is formed a housing unit 150 that accommodates or loads therein the display device 60. In this case, the display device 60 is inserted or loaded into the housing unit 150 such that it is inserted in an optical light path between the focal plane plate 50 and the pentaprism 101 perpendicularly to the light axis of the optical path (FIG. 5A).

The loading unit 150 includes a display device insertion section 151 that defines a space between the focal plane plate 50 and the pentaprism 101 in which space the display device 60 loaded in the optical light path is located and a display device retraction section 152 that defines a space where the display device 60 that is retracted from the optical light path is located. Note that the display device retraction section 152 corresponds to a space surrounded by the upper retraction unit 121 above the display device and the lower retraction unit 131 below the display device.

Figure 6:
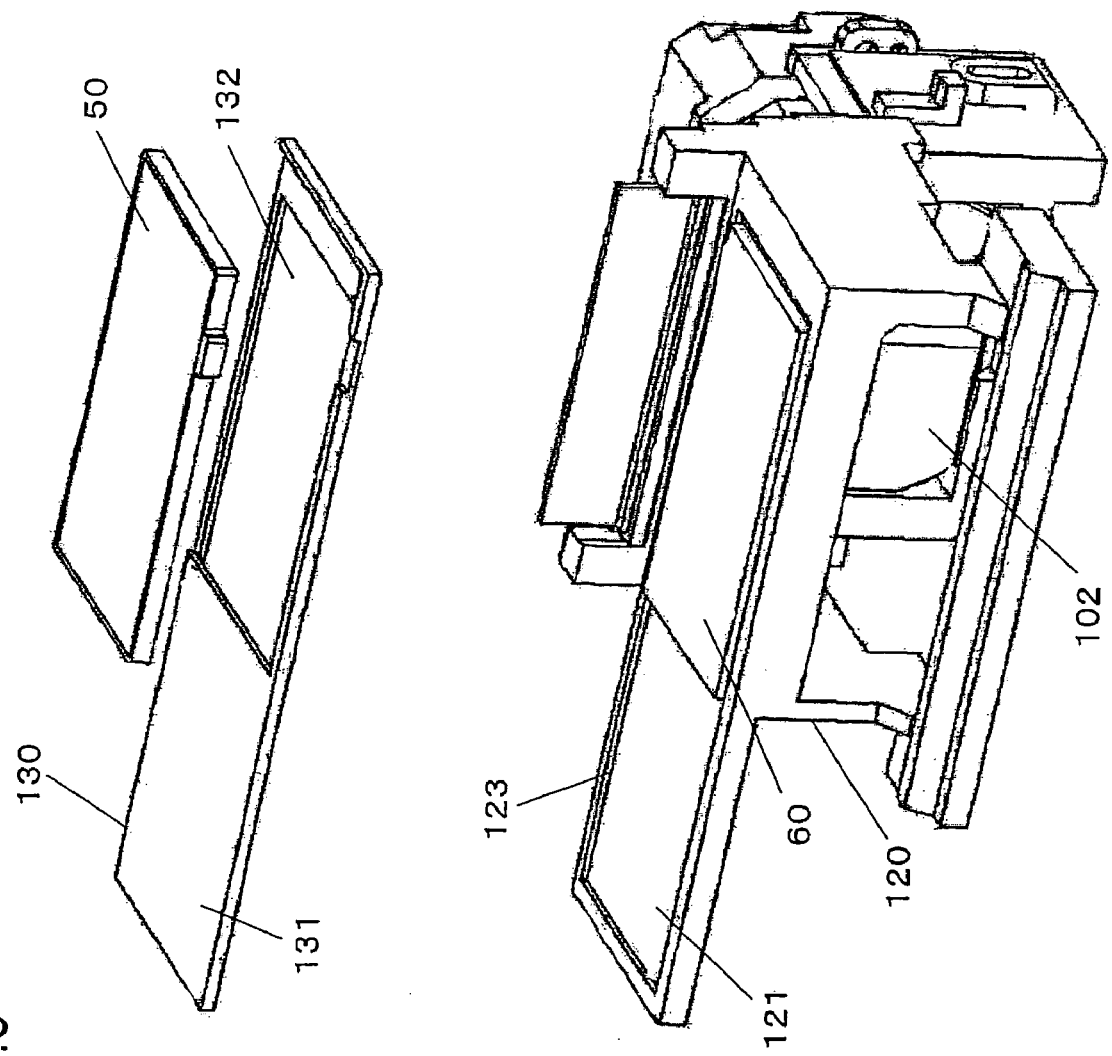
FIG. 6 is an exploded perspective view of a finder unit according to an embodiment of the present invention, illustrating a display device having moved to its insertion position.
Figure 7:
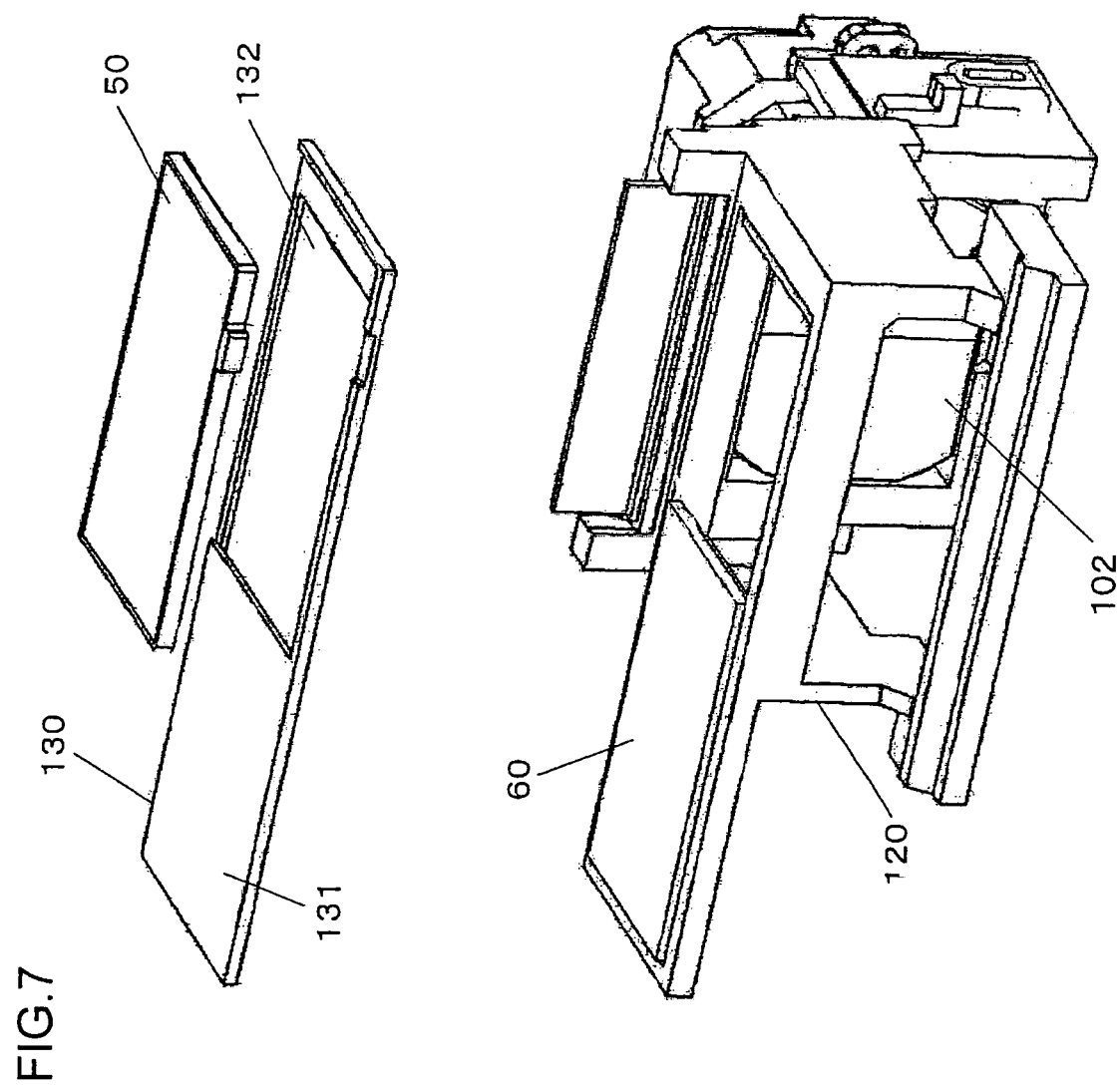
FIG. 7 is an exploded perspective view of a finder unit according to an embodiment of the present invention, illustrating a display device having moved to its retracted position.

In the following description, the position of the display device 60 when it is inserted in the display device insertion section 151 as shown in FIG. 5B is referred to as an "inserted position". On the other hand, the position of the display device 60 when it is retracted into the display device retraction section 152 as shown in FIG. 5C is referred to as a "retracted position". FIG. 6, which corresponds to FIG. 5B, is an exploded perspective view showing the lower part of the finder unit 100 as seen diagonically forward from below, illustrating the display device 60 having moved to the insertion position. FIG. 7, which corresponds to FIG. 5C, is an exploded perspective view showing the lower part of the finder unit 100 as seen diagonically forward from below, illustrating the display device 60 having moved to the retracted position.

In the loading unit 150, the upper case 120 and the lower case 130 are provided with a pair of slide rails 123 and a pair of slide rails 133, respectively, so that the display device 60 can move between the insertion position and the retracted position (FIGS. 2 and 3). Slide movement of the frame part 61 on the slide rails 123 and 133 results in movement of the display device 60 between the insertion position and the retracted position thereof. Note that the frame part 61 is connected to the display device drive unit 140 (FIG. 1) so that the frame part 61 together with the display device 60 can be driven to move between the insertion position and the retracted position.

The display device drive unit 140 is a drive unit that drives the frame part 61 and the display device 60 as described above and includes a linear motion mechanism constituted by, for example, a stepping motor and a lead screw. Note that the linear motion mechanism is only exemplary and the display device drive unit 140 is not limited to the above-mentioned configuration as far as it can move the frame part 61 and the display device 60 between the insertion position and the retracted position.

The display device insertion sections 151 and 152 defining spaces in which the display device 60 is movably arranged are sealed by the upper case 120, the lower case 130, the focal plane plate 50, and the pentaprism 101 for preventing dust and shielding light (FIG. 5A). The FPC 250 connected to the display device 60 extends through an FPC exit port (not shown) provided on the right hand side end of the display device retraction section 152 to outside without deteriorating air-tightness of the loading unit 150. Note that though not shown, the display device retraction section 152 is configured to allow the FPC 250 to bend or bow within the display device retraction section 152 along with the movement of the display device 60 from side to side.

Figure 8A:
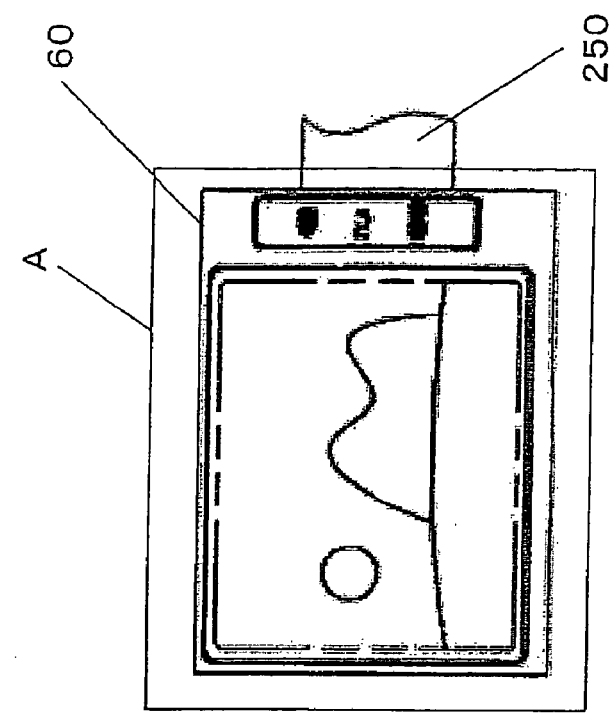
FIG. 8A is a diagram illustrating an image of a photographic subject formed on a focal plane plate and observed through a pentaprism and an eyepiece, with a display device in a retracted position.

When the display device 60 is retracted in the retracted position, the optical light path between the focal plane plate 50 and the pentaprism 101 is not cut across by the display device 60. For this reason, when the main mirror 11 is down (in a mirror downstate), the image of the photographic subject formed on the focal plane plate 50 can be observed through the pentaprism 101 and the eyepiece lens 102. FIG. 8A is a diagram illustrating the image of a photographic subject formed on the focal plane plate 50 that can be observed through the pentaprism 101 and the eyepiece 102.

Note that it is a portion surrounded by a frame A that can be observed by a photographer when he or she looks through the finder. Since the second viewing field frame 52 is arranged between the focal plane plate 50 and the pentaprism 101, the image of the photographic subject formed on the focal plane plate 50 is visible to the photographer through the first aperture 52a of the second viewing filed frame 52 and the display of the photographic conditions displayed on the display device 60 is visible to the photographer through the second aperture 52b of the second viewing field frame 52. The display device 60 displays the photographic conditions in a range that faces (corresponds to) the second aperture 52b of the second view field frame 52 of the display device 60 that has been retracted to the retracted position.

Figure 9A:
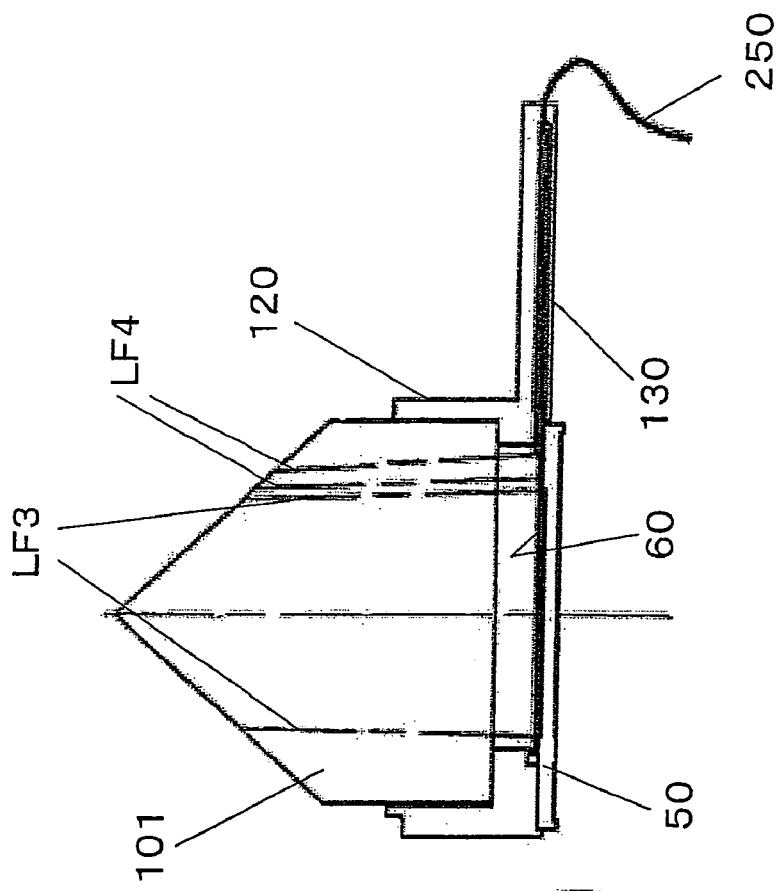
FIG. 9A is a sectional front view showing a pentaprism, a focal plane plate, and a display device as seen forward in a state where the display device is in a retracted position.

FIG. 9A is a sectional front view showing the pentaprism 101, the focal plane plate 50, and the display device 60 as seen forward in a state where the display device 60 is retracted to the retracted position. As shown in FIG. 9A, a light flux LF1 from the focal plane plate 50 through the first aperture 52a of the second viewing field frame 52 and a light flux LF2 from the focal plane plate 50 through the second aperture 52b of the second viewing field frame 52 are incident to the bottom surface of the pentaprism 101. To note, since the image observed through the finder looks horizontally inverted, an image formed by the light flux incident to the right hand side of the bottom surface of the pentaprism 101 as seen toward the front of the camera body 1 looks on the right hand side to the photographer who looks through the finder.

Figure 8B:
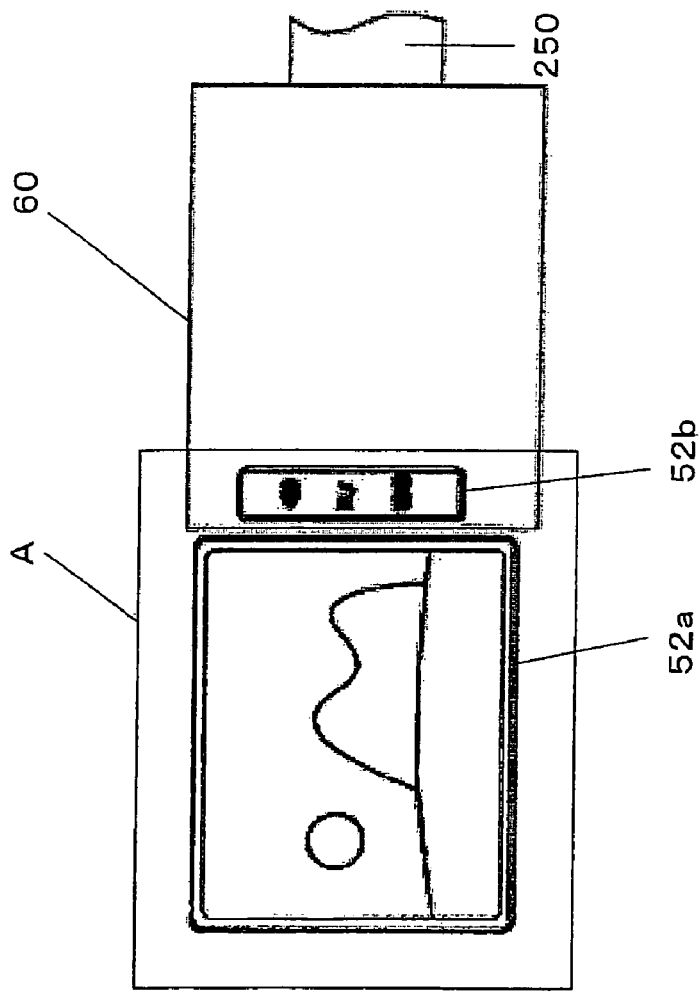
FIG. 8B is a diagram illustrating an image of a photographic subject formed on a focal plane plate and observed through a pentaprism and an eyepiece, with a display device in an insertion position.

When the display device 60 moves to the insertion position, the optical light path between the focal plane plate 50 and the pentaprism 101 is cut across. As a result, although when the photographer looks through the finder, the image of the photographic subject formed on the focal plane plate 50 can not be observed by the photographer. However, as shown in FIG. 8B, the content of the display on the display device 60 can be observed. Note that what can be observed by the photographer when he or she looks through the finder is the portion surrounded by the frame A in FIG. 8B. In this case, the content of the display (for example, a through image) of the display device 60 can be observed through the first aperture 52a of the second viewing field frame 52 and the display on the photographic conditions displayed on the display device 60 can be observed through the second aperture 52b of the second viewing field frame 52. On the display device 60, for example, a through image is displayed in a range corresponding to the first aperture 52a of the second viewing field frame 52 in the display device 60 that has moved to the insertion position while in a range corresponding to the second aperture 52b, photographic conditions are displayed.

Figure 9B:
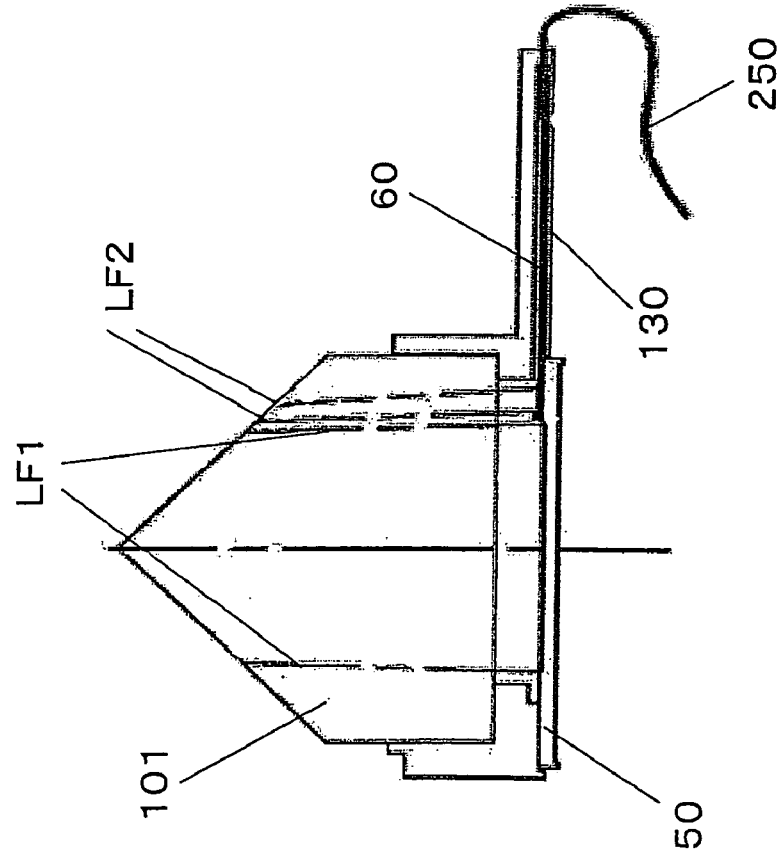
FIG. 9B is a sectional front view showing a pentaprism, a focal plane plate, and a display device as seen forward in a state where the display device is in an insertion position.

FIG. 9B is a cross-sectional front view showing the pentaprism 101, the focal plane plate 50, and the display device 60 as seen forward in a state where the display device 60 has moved to the insertion position. As shown in FIG. 9B, a light flux LF3 from the focal plane plate 50 through the first aperture 52a of the second viewing field frame 52 and a light flux LF4 from the focal plane plate 50 through the second aperture 52b of the second viewing field frame 52 are incident to the bottom surface of the pentaprism 101.

In this manner, the display device 60 is inserted in and removed from the optical light path between the focal plane plate 50 and the pentaprism 101 without moving the focal plane plate 50. Note that the display device 60 is inserted in the optical light path between the focal plane plate 50 and the pentaprism 101 but is different from the image forming position of the focal plane plate 50. However, since the thickness of the display device 60 is small and the display device 60 is arranged in a position that is very close to the focal plane plate 50, both the image of the photographic subject formed on the focal plane plate 50 and the content of the display on the display device 60 are clearly or sharply visible on the side of the eyepiece 102 without adjusting the point focus in particular. Note that the eyepiece 102 side may be constructed such that the depth of focus can be increased. Further, it is desirable that the display device 60 is attached to the under side of the frame part 61 so that a distance between the display surface of the display device and the focal plane plate 50 can be decreased.

In the camera body 1 thus constructed, when the main switch 2 is turned ON, the camera is brought in a photographing standby state. In this case, if the camera is set so as not to display through images, the main mirror 11 is in a mirror down position where it is positioned in the photographic optical path to guide the light flux from the photographic subject to the finder unit 100. The display device 60 is moved by the display device drive unit 140 to the retracted position. As a result, as shown in FIG. 8A, the image of the photographic subject formed on the focal plane plate 50 can be observed through the pentaprism 101 and the eyepiece lens 102.

Note that as described above, the photographic conditions are displayed in a range facing the second aperture 52b of the second viewing field frame 52 of the display device 60 that has retracted to the retracted position. Therefore, the photographer can view the image of the photographic subject formed on the focal plane plate 50 through the first aperture 52a of the second viewing filed frame 52 and the display of the photographic conditions displayed on the display device 60 through the second aperture 52b of the second viewing field frame 52 (FIG. 8A).

When the release button 3 is pressed, the main mirror 11 is rotated by the sequence drive mechanism 22 and the mirror drive mechanism 23 to a mirror up position. Then, the control circuit 21 performs calculations for distance measurement and photometry, the shutter 13 is brought into an open state for a predetermined time, and an image of the photographic subject is captured by the image-capturing element 15 through an interchangeable lens in a photographing mode corresponding to the setting by a mode setting dial (not shown). A photographic signal output from the image-capturing element 15 is subjected to known image processing in an image processing circuit (not shown) and recorded in a recording medium (not shown) as an image data.

After completion of the photographing, the image captured by the image-capturing element 15 (a preview so-called "rec review image") is displayed on the rear liquid crystal device 24 for a predetermined time. In addition, after completion of the photographing, resetting of each unit and charging action are performed and the main mirror 11 is rotated by the sequence drive mechanism 22 and the mirror drive mechanism 23 to the mirror down position again to return to a photographing standby state.

When the camera is set such that the a through image is displayed on the display device 60, the main mirror 11 is rotated by the sequence drive mechanism 22 and the mirror drive mechanism 23 to a mirror up position and the display device 60 is moved by the display device drive unit 140 to the insertion position. In this manner, the display device 60, as linked to switching of the position of the main mirror 11 by the sequence drive mechanism 22 and the mirror drive mechanism 23, is inserted in and removed from the optical light path between the focal plane plate 50 and the pentaprism 101.

The shutter 13 is controlled to be in an open state so that the light from the photographic subject can be guided into the image-capturing element 15. This enables the image-capturing element 15 to capture an image of the photographic subject, repeatedly. Then, a through image captured by the image-capturing element 15 is displayed on the display device 60. As a result, as shown in FIG. 8B, the through image displayed on the display device 60 and display of photographic conditions become observable through the pentaprism 101 and the eyepiece lens 102.

When the release button 3 is pressed, the control circuit 21 performs calculations for distance measurement and photometry, the shutter 13 is brought into a closed state for a while, and again the shutter 13 is brought into an open state for a predetermined time to allow an image of the photographic subject to be captured by the image-capturing element 15 through an interchangeable lens in a photographing mode corresponding to the setting by the mode setting dial (not shown). After completion of the photographing, a rec view image is displayed on the display device 60 only for a predetermined time and then a through image is displayed again on the display device 60. In addition, after completion of the photographing, resetting of each unit and charging action are performed but the main mirror 11 remains held in the mirror up position.

When the camera is set such that a through image is displayed on the rear liquid crystal device 24, the main mirror 11 is rotated by the sequence drive mechanism 22 and the mirror drive mechanism 23 to the mirror up position. The display device 60 is moved to the retracted position by the display device drive mechanism 140. The shutter 13 is controlled to be in an open state so that the light from the photographic subject can be guided into the image-capturing element 15. This enables the image-capturing element 15 to capture an image of the photographic subject repeatedly. Then, on the rear liquid crystal device 24, there is displayed a through image captured by the image-capturing device 15.

When the release button 3 is pressed, the control circuit 21 performs calculations for distance measurement and photometry, the shutter 13 is brought into a closed state, and again the shutter 13 is brought into an open state for a predetermined time to allow an image of the photographic subject to be captured by the image-capturing element 15 through an interchangeable lens in a photographing mode corresponding to the setting by the mode setting dial (not shown). After completion of the photographing, a rec view image is displayed on the display device 60 only for a predetermined time and then a through image is displayed again on the display device 60. In addition, after completion of the photographing, resetting of each unit and charging action are performed but the main mirror 11 remains held in the mirror up position.

—Flowchart—

Figure 10:
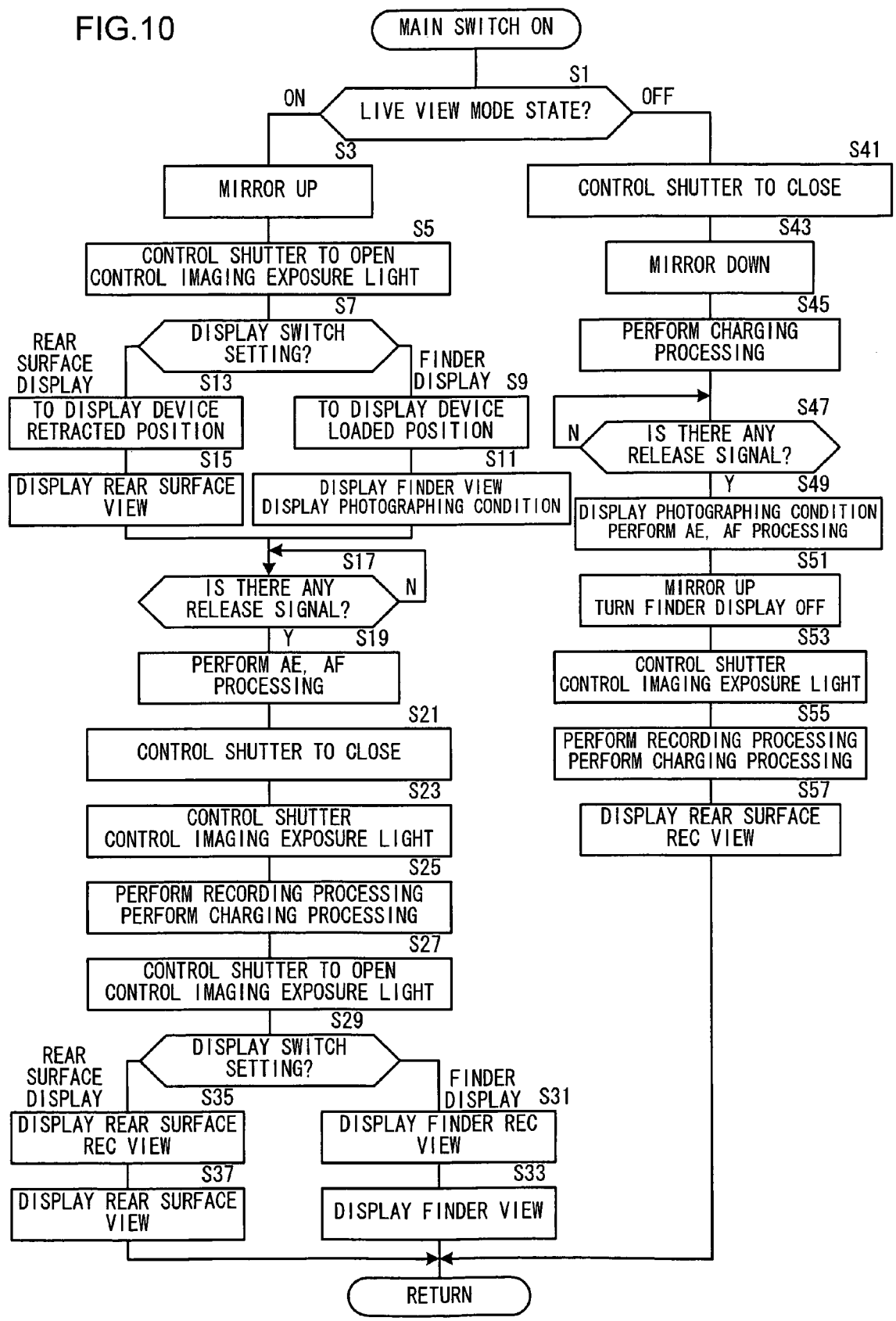
FIG. 10 is a flowchart illustrating processing performed in the camera body upon image-capturing of an image of a photographic subject.

FIG. 10 is a flowchart illustrating processing performed in the camera body 1 upon image-capturing of an image of a photographic subject. The program that causes a computer to execute operations indicated in the flowchart shown in FIG. 10 is started up when the main switch 2 is turned ON and executed by the control circuit 21. In a step S1, it is judged whether or not the camera is set to a live view mode in which a through image is displayed. Note that whether to set a live view mode is achieved by a mode setting dial (not shown).

In the step S1, if it is judged that the camera has been set to a live view mode, the flow of control proceeds to a step S3, where the sequence drive mechanism 22 is controlled so as to rotate the main mirror 11 to a mirror up position and then, the flow of control proceeds to a step S5. In the step S5, the shutter 13 is controlled so that the photographic aperture is opened and exposure is controlled to control the brightness of the image of the photographic subjected captured by the image-capturing element 15. Then, the flow of control proceeds to a step S7. In the step S7, a judgment is made on a state of display switch setting whether observation of a through image is to be performed on the finder side or on the rear liquid crystal device 24. Note that the display switch setting is performed by operating the mode setting dial (not shown).

In the step S7, if the result of the judgment indicates that the camera is set so that the through image is observed on the finder side, the flow of control proceeds to a step S9, where the display device drive unit 140 is controlled so that the display device 60 can be inserted in the insertion position, and the flow of control proceeds to a step S11. In the step S11, as shown in FIG. 8B, a through image and photographing conditions are displayed on the display device 60 and the flow of control proceeds to a step S17. In the step S17, the camera is in a standby mode until the release button 3 is pressed to input a release signal to the control circuit 21. If the result of the judgment in the step S17 is YES, the flow of control proceeds to a step S19 to control known photometry and distance measurement. Note that the photometry and distance measurement in the step S19 are so-called image surface AE (automatic exposure) and image surface AF (automatic focusing), respectively.

In a step S21, the shutter 13 is controlled to shield the photographic aperture and display of a through image is brought to a halt and the flow of control proceeds to a step S23. In the step S23, the shutter 13 is controlled to release the photographic aperture for a predetermined time and perform control of exposure by the image-capturing element 15, a so-called electronic shutter. Then, the flow of control proceeds to a step S25. In the step S25, the sequence drive mechanism 22 is controlled such that processing of recording the image data of the image of the photographic subject obtained in the step S23 and known charging of each unit are performed and the flow of control proceeds to a step S27.

In the step S27, the shutter 13 is controlled to release the photographic aperture and perform control of exposure to control the brightness of the image of the photographic subject captured by the image-capturing element 15, and then the flow of control proceeds to a step S29. In the step S29, a judgment is made on a state of setting of the display switch setting that switches whether the through image is to be observed on the finder side or on the rear liquid crystal device 24. In the step S29, if it is judged that the camera is set to observe the through image on the finder side, the flow of control proceeds to a step S31 and the display device 60 is controlled to perform a rec review display only for a predetermined time. That is, the image of the photographic subject obtained by the image-capturing in the step S23 is displayed on the display device 60 only for the predetermined time.

After the step S31 is executed, the flow of control proceeds to a step S33 and both the through image and photographing conditions are displayed on the display device as shown in FIG. 8B, and the flow of control returns to the step S1.

In the step S7, if the result of the judgment is that the camera is set to enable observation of the through image on the rear liquid crystal device 24, the flow of control proceeds to the step S13 to control the display device drive unit 140 to cause the display device 60 to be retracted to the retracted position. Then the flow of control proceeds to a step S15. In the step S15, the through image and photographing conditions are displayed on the rear liquid crystal device 24 and the flow of control proceeds to a step S17.

In the step S29, if it is judged that the camera is set to allow a through image to be observed on the rear liquid crystal device 24, the flow of control proceeds to a step S35 and the rear liquid crystal device 24 is controlled to display a rec review display only for a predetermined time. Then the flow of control proceeds to a step S37. In the step S37, a through image and photographing conditions are displayed on the rear liquid crystal device 24 and the flow of control returns to the step S1.

In the step S1, if it is judged that the camera is not set to a live view mode, the flow of control proceeds to a step S41, and the shutter 13 is controlled to shield the photographic aperture and the display device drive unit 140 is controlled to cause the display device 60 to be retracted to the retracted position. Then the flow of control proceeds to a step S43. In the step S43, the sequence drive mechanism 22 is controlled to cause the main mirror 11 is rotated to the mirror down position and the flow of control proceeds to a step S45. In the step S45, the sequence control mechanism 22 is controlled to perform charging of each unit and the flow of control proceeds to a step S47.

In the step S47, the camera is in a standby mode until the release button 3 is pressed to input a release signal to the control circuit 21. If the result of the judgment in the step S47 is YES, the flow of control proceeds to a step S49 to control known photometry and distance measurement and display photographing conditions in a range facing the second aperture 52b of the second viewing field frame 52 of the display device 60 that has retracted to the retracted position. Then, the flow of control proceeds to a step S51. In the step S51, the sequence drive mechanism 22 is controlled to rotate the main mirror 11 to the mirror up position and bring the display of the photographing conditions of the display device 60 into a halt, and the flow of control proceeds to a step S53.

In the step S53, the shutter 13 is controlled to release the photographing aperture only for a predetermined time and perform control of exposure by the image-capturing element 15, so-called electronic shutter, and the flow of control proceeds to a step S55. In the step S55, the sequence drive mechanism 22 is controlled to perform processing for recording the image data of the image of the photographic subject captured in the step S53 and known charging of each unit, and the flow of control proceeds to a step S57. In the step S57, the rear liquid crystal device 24 is controlled to perform a rec review display only for a predetermined time and the flow of control returns to the step S1.

The camera body 1 including the observation device according to the present invention provides the following advantages.

(1) Since the camera body 1 is configured to enable the display device 60 to be inserted in and removed from the optical light path between the focal plane plate 50 and the pentaprism 101 without moving the focal plane plate 50, a through image can be observed on the finder side without moving the focal plane plate 50, the arrangement of which requires a high precision. This makes it possible to balance securing high precision in the arrangement of the focal plane plate 50 and convenience due to observation of a through image on the finder side.

(2) Since the camera body 1 is configured to enable the display device 60 to be inserted in the optical light path between the focal plane plate 50 and the pentaprism 101 but is different from the image forming position of the focal plane plate 50, it is unnecessary to move the focal plane plate 50 when the display device 60 is inserted in the optical light path, so that the high precision in arrangement of the focal plane plate 50 can be secured.

(3) Since the camera body 1 is configured to enable the display device 60 to be inserted closer to the eyepiece unit 1a than the focal plane plate 50, the content of the display of the display device 60 can be observed without the image passing through the focal plane plate 50, a clear or sharp display image can be observed.

(4) The camera body 1 is configured to enable the display device 60 to be inserted in the optical light path between the focal plane plate 50 and the pentaprism 101 as linked to the position of rotation of the main mirror 11. This improves convenience since the photographer does not particularly have to be aware of the position of the display device 60 or the position of rotation of the main mirror 11.

(5) The camera body 1 is configured to enable the display device 60 to be inserted in and removed from the optical light path between the focal plane plate 50 and the pentaprism 101 in a direction perpendicular to the optical axis of the light path. This enables insertion of the display device 60 to a site where a spacing in the direction of the optical axis of the finder optical system is narrow to prevent the finder unit 100 from getting larger in the direction of the optical axis and contribute to a reduction in size of the finder unit 100 and the camera body 1.

(6) Since the camera is configured such that the display device 60 inserted in the insertion position displays a through image, so that the display device 60 can be used as an indicator of an electronic view finder and the photographer can view the captured image displayed on the display device 60 through the eyepiece lens 102. Therefore, even under strong sunlight, a sharp through image is visible. Further, since image-capturing is possible with the face of the photographer applied to the eyepiece unit 1a, the through image can be easily confirmed even when an image of a photographic subject that is moving vigorously is captured. This enables the photographer to obtain an image that matches what he or she intends to.

(7) The camera is configured such that the photographic conditions are displayed on the display device 60 regardless of its position so that the photographic conditions displayed on the display device 60 are visible to the photographer through the eyepiece lens 102. This makes it possible to eliminate separately providing a display device for displaying photographic conditions, so that the cost for production can be reduced.

—Modifications—

Figure 11:
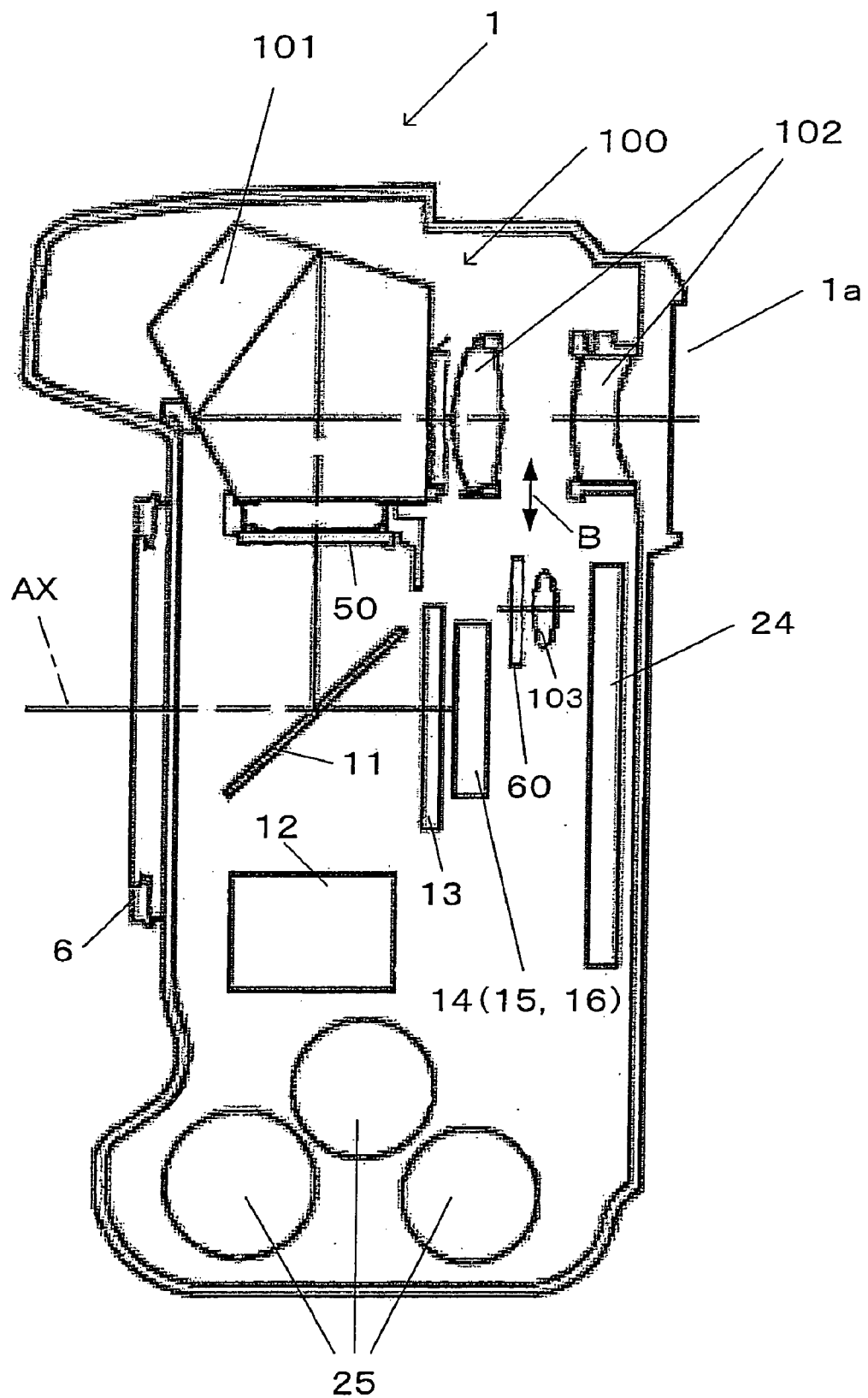
FIG. 11 is a cross-sectional side view of the camera body of a camera according to a modification of the present invention.

(1) In the above-mentioned embodiment, the camera is configured to enable the display device 60 to be inserted in and removed from the optical light path between the focal plane plate 50 and the pentaprism 101 in a direction perpendicular to the optical axis of the light path. However, the present invention is not limited to this configuration. Fox example, the display device 60 may be inserted in and removed from the optical light path closer to the eyepiece unit 1a than the pentaprism 101. FIG. 11 is a cross-sectional side view of the camera body 1, illustrating an example in which the display device 60 can be inserted in and removed from the light path between lenses that constitute the eyepiece lens 102. In this manner, when the display device 60 is inserted in a position remote from the focal plane plate 50 along the light path as indicated by an arrow B, it is necessary for the camera body 1 to be configured to enable a lens 103 for adjusting point of focus to be inserted in and removed from the optical light path together with the display device 60, so that the content of display on the display device 60 is visible to the photographer. Note that instead of providing the lens 103, a distance between the lenses that constitute the eyepiece lens 102 may be varied to make the content of the display device visible to the photographer.

(2) In the above-mentioned embodiment, the image obtained by capturing is a still image. However, the camera maybe configured to capture a video image and display a through image on the display device 60 or the rear liquid crystal device 24 upon taking a video image. In this case, recording of the image data of the image of the photographic subject obtained by capturing the image with the image-capturing element 15 and displaying of the through image are performed simultaneously.

(3) In the above-mentioned embodiment, the camera is configured such that the display device 60 is moved perpendicularly to the optical axis of the finder optical system. However, the present invention is not limited thereto. For example, a display device having flexibility, such as one used in an electronic paper, may be used as the above-mentioned display device 60 and retracted in a deformed state, such as bent or rolled up, when it is retracted to the retracted position.

(4) In the above-mentioned embodiment, a display device that includes an organic EL (electroluminescence) element as the display device 60. However, the present invention is not limited thereto; a low profile display device such as a self-luminescent display device of another type or a display device having a light source such as a backlight may be used as the display device 60.

(5) In the above-mentioned embodiment, the observation device of the present invention is applied to a camera. However, the present invention may be applied to various types of observation devices that observe an object, such as a binocular and a microscope.

(6) In the above-mentioned embodiment, the photometry and distance measurement (the step S19 in FIG. 10) upon image-capturing when the camera is set in a live view mode are so-called image surface AE and image surface AF using the image-capturing element 15. However, the present invention is not limited thereto. For example, the photometry and distance measurement upon image-capturing may be similar to the photometry and distance measurement upon image-capturing when the camera is not set to a live view mode (the step S49 in FIG. 10). That is, the photometry and distance measurement upon image-capturing when the camera is set to a live mode may be performed by an AE sensor (not shown) and the AF sensor 12. In this case, it is necessary to temporarily move the main mirror 11 down immediately before the photometry and distance measurement in order td guide the light from the photographic subject to the AE sensor (not shown) and the AF sensor 12.

(7) Two or more of the above-mentioned embodiment and the modifications may be combined with each other as appropriate.

Note that the present invention is not limited to the above-mentioned embodiment and modifications and includes various types of observation devices. The present invention includes an optical unit on which an intermediate image of an object and a camera including such an observation device, a display unit that emits light, and a display unit moving unit that causes the display unit to be inserted in and removed from an optical light path for observing the object without moving the optical unit. The present invention also includes a camera equipped with such an observation device.

What is claimed is:

1. An observation device, comprising:
an optical unit on which an intermediate image of an object to be observed is formed;
a display unit that displays an image of a subject to be photographed; and
a display unit moving unit that causes the display unit to be inserted in and removed from an optical light path for observing the object without moving the optical unit.

2. An observation device according to claim 1, wherein:
the display unit is inserted in the optical light path for observing the object in a position that is different from a position of the optical unit and from a position in which the intermediate image is formed.

3. A camera, comprising:
a finder optical system; and
an image-capturing unit that captures an image of a subject; wherein
the finder optical system includes
an eyepiece unit;
a focal plane plate on which an intermediate image of an image of a photographic subject is formed;
a display unit that displays an image of a subject to be photographed; and
a display unit moving unit that causes the display unit to be inserted in and removed from a light path in a position closer to the eyepiece unit than the focal plane plate.

4. A camera according to claim 3, further comprising:
a mirror capable of being switched between a first position in which upon observation of the image of the subject by the finder optical system, light flux from the photographic subject is reflected by the mirror to be guided to the finder optical system and a second position in which upon photographing, light flux from the photographic subject is directed to the image capturing unit; and
a switching unit that switches the position of the mirror, wherein
the display unit is inserted in and removed from the light path interlocked with switching of the position of the mirror by the switching unit.

5. A camera according to claim 3, wherein:
the display unit is inserted in and removed from the light path of the finder optical system perpendicular to an axis of the light path.

6. A camera according to claim 3, wherein:
the display unit displays the image of the subject captured by the image-capturing unit.

7. A camera according to claim 6, wherein:
the display unit displays a photographic condition upon capturing the image of the subject.

8. A camera according to claim 3, further comprising:
a pentaprism located in the optical light path between the focal plane plate and the eyepiece unit, wherein the display unit is inserted in and removed from the light path of the finder optical system in a position closer to the eyepiece unit than the pentaprism.

9. A camera according to claim 8, wherein:
the eyepiece unit includes a plurality of lenses; and
the display unit is inserted in and removed from the light path in a position between the lenses in the eyepiece unit.

10. A camera according to claim 8, further comprising:
a lens for adjusting a focus state of a display output by the display unit.

11. A camera according to claim 9, wherein:
the lenses in the eyepiece unit are adjustable to vary a distance therebetween to adjust a focal length of the eyepiece unit.

12. A camera according to claim 8, further comprising:
a mirror capable of being switched between a first position in which upon observation of the image of the subject by the finder optical system, light flux from the photographic subject is reflected by the mirror to be guided to the finder optical system and a second position in which upon photographing, light flux from the photographic subject is directed to the image capturing unit; and
a switching unit that switches the position of the mirror, wherein
the display unit is inserted in and removed from the light path interlocked with switching of the position of the mirror by the switching unit.

13. A camera according to claim 8, wherein:
the display unit is-inserted in and removed from the light path of the finder optical system perpendicular to an axis of the light path.

14. A camera according to claim 8, wherein:
the display unit displays the image of the subject captured by the image-capturing unit.

15. A camera according to claim 14, wherein:
the display unit displays a photographic condition upon capturing the image of the subject.

16. A camera according to claim 3, wherein:
the display unit is removed from the optical light path in a deformed state.

17. A camera according to claim 1, wherein:
the display unit includes a self-luminescent element.

18. A camera according to claim 1, wherein:
the display unit includes a light source.

19. A camera according to claim 6, further comprising;
a back monitor disposed on a rear surface of the camera to display the image of the subject captured by the image-capturing unit,
a selection unit that selects one of the display unit and the back monitor, and
a display control unit to control a display of the captured image of the subject on the selected one of the display unit and the back monitor, wherein:
the display control unit causes the display unit to be inserted in the optical light path, when the selection unit selects the display unit and to be removed from the optical light path, when the selection unit selects the back monitor.

20. A camera according to claim 17, further comprising:
a mirror capable of being switched between a first position in which upon observation of the image of the subject by the finder optical system, light flux from the photographic subject is reflected by the mirror to be guided to the finder optical system and a second position in which upon photographing, light flux from the photographic subject is directed to the image capturing unit; and
a switching unit that switches the position of the mirror, wherein
the display unit is inserted in and removed from the light path interlocked with switching of the position of the mirror by the switching unit.

* * * * *

UNITED STATES PATENT AND TRADEMARK OFFICE
CERTIFICATE OF CORRECTION

PATENT NO. : 7,639,942 B2
APPLICATION NO. : 12/003494
DATED : December 29, 2009
INVENTOR(S) : Tsuyoshi Okutani It is certified that error appears in the above-identified patent and that said Letters Patent is hereby corrected as shown below:

Column 15, Line 29, change "is-inserted" to --is inserted--.

Signed and Sealed this

Sixteenth Day of March, 2010

David J. Kappos
*Director of the United States Patent and Trademark Office*